(12) United States Patent
Burkhardt et al.

(10) Patent No.: US 6,881,166 B1
(45) Date of Patent: Apr. 19, 2005

(54) PULLEY

(75) Inventors: Georg Burkhardt, Weilheim/Teck (DE); Bruno Kaechele, Weilheim/Teck (DE)

(73) Assignee: Wilhelm Kaechele GmbH Elastomertechnik, Wilhelm/Teck (DE)

( * ) Notice: Subject to any disclaimer, the term of this patent is extended or adjusted under 35 U.S.C. 154(b) by 0 days.

(21) Appl. No.: 09/673,135

(22) PCT Filed: Apr. 9, 1999

(86) PCT No.: PCT/DE99/01078

§ 371 (c)(1),
(2), (4) Date: Oct. 11, 2000

(87) PCT Pub. No.: WO99/53223

PCT Pub. Date: Oct. 21, 1999

(30) Foreign Application Priority Data

Apr. 11, 1998 (DE) .......................... 198 16 327

(51) Int. Cl.[7] .............................................. F16H 55/36
(52) U.S. Cl. ....................... 474/176; 474/166; 474/174
(58) Field of Search ................................ 474/174, 175, 474/176, 177, 179, 166, 167, 268, 190–192; 74/574

(56) References Cited

U.S. PATENT DOCUMENTS

| | | | | |
|---|---|---|---|---|
| 2,954,061 A | * | 9/1960 | Stordal | 474/167 |
| 4,571,225 A | * | 2/1986 | Lengenfelder, Jr. et al. | 474/176 |
| 5,019,019 A | * | 5/1991 | Jones | 474/166 |
| 5,695,176 A | * | 12/1997 | Colford | 74/574 |
| RE36,038 E | * | 1/1999 | Nakamura et al. | 310/65 |

FOREIGN PATENT DOCUMENTS

| | | | |
|---|---|---|---|
| CH | 641254 | * | 2/1984 |
| EP | 0 185 531 | | 6/1986 |
| EP | 194948 | * | 9/1986 |
| EP | 312-256 | * | 4/1989 |
| FR | 1 265 904 | | 5/1961 |
| FR | 1 289 982 | | 2/1962 |
| GB | 418 549 | | 11/1934 |
| JP | 59-58261 | * | 4/1984 |
| JP | 8-42635 | * | 2/1996 |
| JP | 8-114240 | * | 5/1996 |
| JP | 9-14400 | * | 1/1997 |

* cited by examiner

*Primary Examiner*—Marcus Charles
(74) *Attorney, Agent, or Firm*—Foley & Lardner LLP

(57) ABSTRACT

A pulley consists of a pulley basic body which has a cylindrical outer circumferential surface. Sitting on this cylindrical outer circumferential surface is a tire which is of sandwich-like design with regard to its radial extent. This results in a plurality of rings concentric to one another. The ring which is furthest on the inside in the radial direction and the ring which is furthest on the outside in the radial direction are in each case elastomeric rings, whereas a reinforcing ring is located between them. The elastomeric outer ring is harder than the elastomeric inner ring, so that a very abrasion-resistant surface is achieved, over which the rope runs, whereas the elastomeric inner ring provides for adequate resilience. The reinforcing ring is provided in order to distribute the rope load as uniformly as possible over the elastomeric inner ring.

31 Claims, 5 Drawing Sheets

PULLEY

BACKGROUND OF THE INVENTION

Pulleys are required for guiding and supporting ropes in aerial tramways for the transport of materials and passengers. As shown by EP-A-O 185 531, such pulleys consist of a basic body which has a wheel hub with which the pulley is mounted so as to be rotatable on a fixed spindle. Emanating from the wheel hub are spokes, which are designed as compression spokes and connect the wheel hub to an outer ring of the basic body. This outer ring forms a cylindrical outer circumferential surface, which is defined in the axial direction and thus laterally by two flange disks. The flange disks are a one-piece component of the outer ring.

A tire made of a hard elastomeric material sits in the slot defined in this way, the outer circumferential surface of which tire forms a rope groove. The inner circumferential surface of this tire is a cylindrical surface and has a slightly larger diameter than the slot contained in the outer circumference of the outer pulley ring. A further ring, which is to be elastic, sits in this gap.

The radially outer ring of the rope groove is to be sufficiently wear-resistant, whereas the other, radially inner ring is to produce a certain radial resilience.

However, it has been found here that, in such pulleys, the radial resilience is not sufficient to absorb forces which are produced owing to the fact that a clamping socket acting on the rope runs over the pulley.

The clamping sockets, via which the gondolas hanging on the rope are connected to the rope, constitute local thickening from the point of view of the pulley. When they run over the pulley, on account of the thickening, either the load hanging on the rope must be raised accordingly or the pulley must move downward. This results in considerable forces, since the change in the distance between the center of the pulley and the core of the rope must take place relatively quickly. Even if the pulley as a whole is mounted in an elastic manner, the forces are enormous.

A further problem with such pulleys is the flexing work which the elastomeric material is subjected to during the running. At that location at which the rope rests, the elastomeric tire is compressed and, on account of the rotation of the pulley, this compressed region of the elastomeric tire runs around along the tire, as a result of which flexing work is produced. The flexing work inevitably leads to heating and corresponding wear of the elastomeric tire.

SUMMARY OF THE INVENTION

An object of the invention is to provide a pulley which behaves in a more favorable manner with regard to the running quality and the wear.

This object is achieved according to the invention by the pulley wherein the tire sitting on the outer circumferential surface consists of two rings, a radially outer and a radially inner ring. The radially outer ring contains the rope groove and is comparatively hard and wear-resistant.

Suitable materials for the outer ring are plastics and correspondingly hard elastomers.

On the other hand, the radially inner ring is made of a comparatively soft elastomer, which is to have as little damping as possible. When the clamping socket runs over it, the radially inner ring is intended to merely yield in an elastic manner, but is to perform as little damping work as possible.

So that the flexing work, which is achieved by the compression of the radially inner ring, is distributed as far as possible over the entire radially inner ring and is not only effective in a very pronounced local manner, a reinforcing ring is provided, which is located in the tire. This reinforcing ring may be embedded both between the radially outer ring and the radially inner ring and inside one of the rings.

The reinforcing ring achieves the effect that the outer elastomeric ring largely retains its circular form and is subjected to scarcely any flexing work.

Since a material having little internal damping may be selected for the inner ring, less flexing work is produced and thus less heating is produced during operation of the pulley.

In order to produce the greater softness of the inner elastomeric ring, the inner elastomeric ring may either be made of a softer material or it may be made softer by corresponding bores or chambers which are contained in it.

A further improvement in the running properties is achieved if the tire contains a reinforcing ring. This reinforcing ring ensures that the force originating from the supported rope is distributed uniformly over the inner ring. As a result of the reinforcing ring, the inner ring is not deformed locally in that region which is located directly below the rope supporting point, but rather the deformation extends over the entire circumferential length of the inner ring.

The reinforcing ring may be a plastic molding, a sheet-metal formed part or a metal casting or forging, the plastic molding being somewhat more resilient than the metal part. The selection of the hardness of the plastic molding can determine which circumferential region of the inner elastomeric ring is deformed as a result of the rope supporting force.

The form of the reinforcing ring is advantageously selected in such a way that the radially inner elastomeric ring and/or the radially outer ring has an approximately constant thickness as viewed over its axial length.

In order to make it possible to easily remove the tire from the pulley body without impairing the firm seating of the tire on the pulley body, a clamping device is expediently provided. This clamping device acts essentially in the radial direction.

In the simplest case, the clamping device has an annular, essentially rotationally symmetrical form having a radially inner surface and a radially outer surface. It is either fitted in between the tire and the pulley body or is located virtually inside the tire.

In order to achieve the clamping effect, the clamping device is split in two, the radial pretension force being produced by these parts being clamped together axially, and this pretension force acts radially inward against the pulley body on the one hand and outward toward the tire on the other hand.

The simplest way to achieve the clamping effect is to split the clamping device into two rings, the thickness of which varies in the axial direction. In the simplest case, each of the rings has an outer frustoconical form and a frustoconical bore, the cones defining these surfaces being in opposition. When the two rings of the clamping device are assembled so as to be facing one another with their thinner end, a constriction is obtained approximately in the center relative to their axial extent. If the tire or the pulley body is designed in a correspondingly complementary manner, a movement of the two rings of the clamping device toward one another produces the desired radial clamping forces relative to one another.

BRIEF DESCRIPTION OF THE DRAWINGS

Exemplary embodiments of the subject matter of the invention are shown in the drawing, in which.

DETAILED DESCRIPTION OF THE PREFERRED EMBODIMENTS

Figure 1:
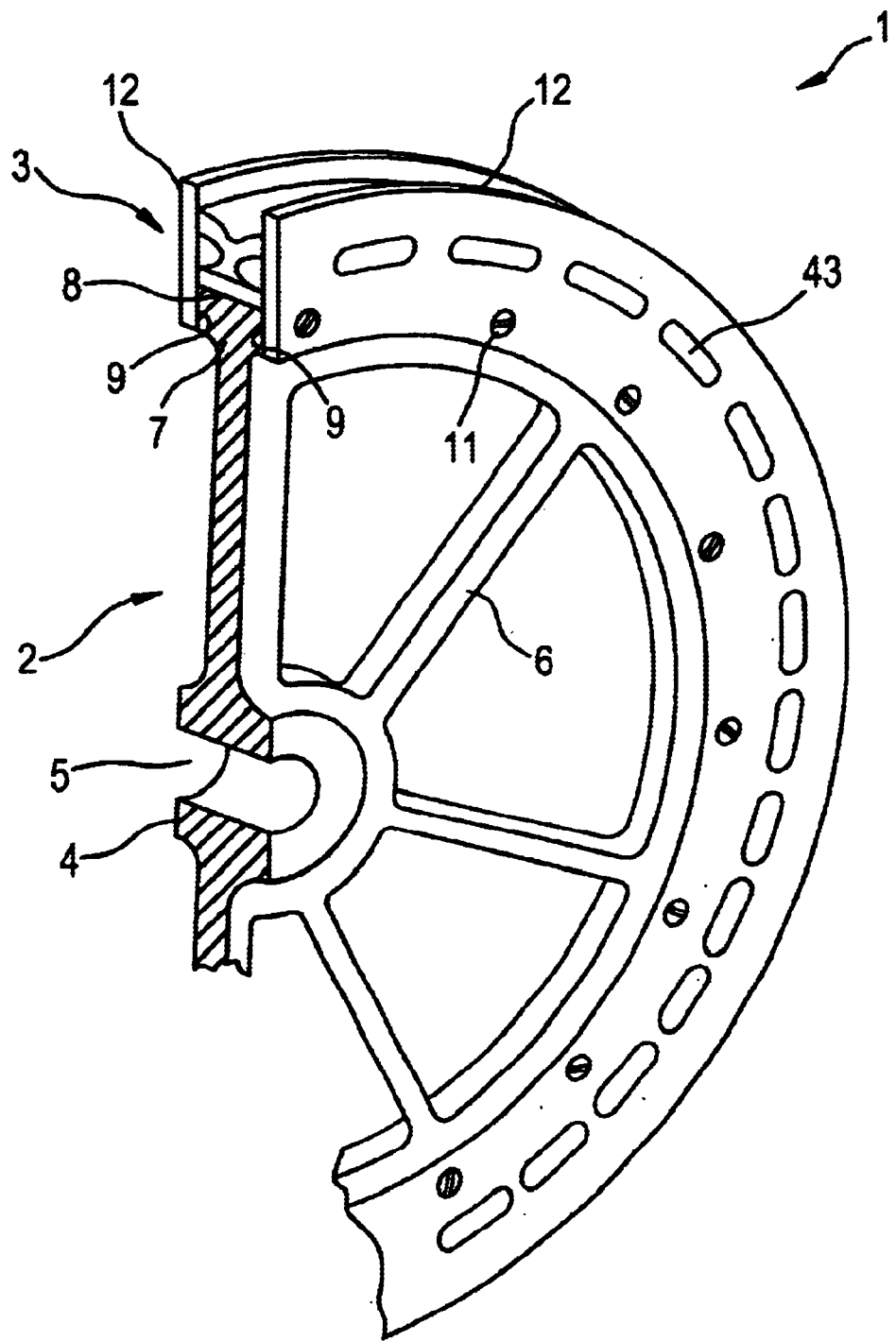
FIG. 1 shows a pulley according to the invention in a perspective truncated representation.

A pulley 1 for aerial tramways is illustrated in FIG. 1 in a perspective truncated representation.

The pulley 1 has a pulley body 2 and a tire 3 fastened to the latter. The pulley body 2 is a one-piece casting, which forms a central, approximately cylindrical hub 4 with a continuous bearing bore 5. A plurality of spokes 6, which are designed as compression spokes, emanate radially outward from the hub 4 to an outer pulley ring 7, which is connected in one piece with the hub 4 via the compression spokes 6. The pulley ring 7 forms a cylindrical seating face 8 for the tire 3. The cylindrical seating face 8 is concentric to the bearing bore 5.

The pulley ring 7 is defined in the axial direction by two flank faces 9, which are essentially parallel to one another and, starting from the cylindrical seating face 8, extend by a short distance in the radial direction toward the hub 4.

In the exemplary embodiment shown, the flank faces 9 are annular flat faces which are parallel to one another and are at a distance apart corresponding to the axial length of the seating face 8. However, they may also be frustoconical surfaces which are oriented in such a way that the imaginary apex of the cone lies on the respectively other side of the pulley 1.

In each case a flange disk 12 is fastened to each flank face 9 by means of several screws 11 distributed equidistantly. The two flange disks 12 serve to axially secure the tire 3 and are also intended to additionally secure the rope running over it in order to prevent the latter from falling off at the side.

In a typical pulley, the effective diameter ranges between 100 and 700 mm.

Figure 2:
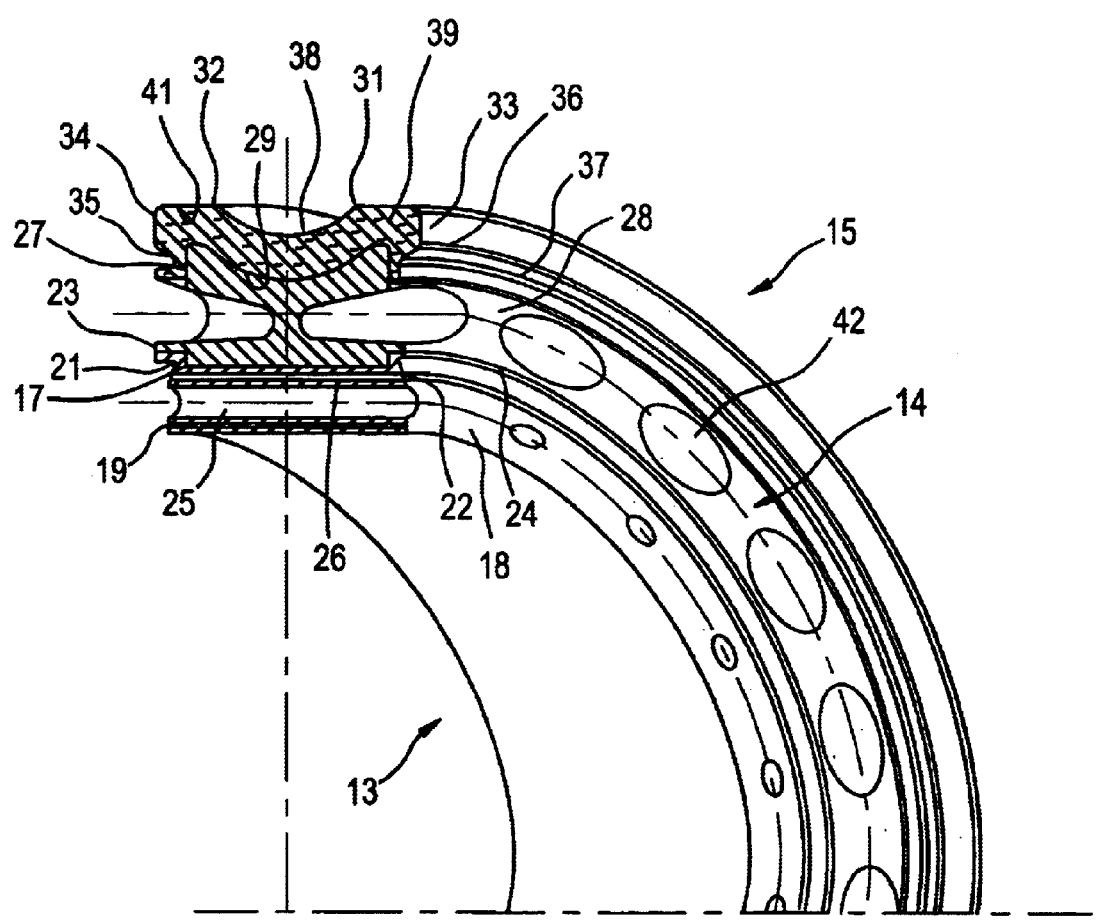
FIG. 2 shows the tire of the pulley according to FIG. 1 in an enlarged, truncated, perspective representation.

In FIG. 2, the tire 3 is shown in a perspective, cut-open, enlarged representation. The axis of rotation of the pulley 1 lies in the section plane.

Relative to the radial direction, the tire 3 is of sandwich-like construction and is essentially formed by three rings 13, 14 and 15 lying concentrically one inside the other. The radially inner ring 13 is made of an elastomeric material having a Shore hardness of between 40 and 75. It is defined by a radially inner cylindrical surface 16, a cylindrical surface 17 pointing radially outward, and two flank faces 18 and 19 lying in the axial direction. In addition, two lateral strips 21 and 22 are integrally formed on the outside of the inner elastomeric ring 13, and these lateral strips 21 and 22 lengthen the two flank faces 18, 19 radially outward by a short distance. The strips 21 and 22 merge into lips 23 and 24 pointing axially outward. In addition, the ring 13 contains a textile reinforcement (not shown) next to the inner circumferential surface 16.

In the region between the cylindrical surface 16 and the lips 23, 24, the cross section of the inner elastomeric ring 13 is approximately trapezoidal in such a way that the inner elastomeric ring 13 has its greatest axial extent in the region of the cylindrical surface 16. It is slightly narrower at the level of the axially outer cylindrical surface 17.

To improve the heat dissipation and to improve the resilience, the elastomeric ring 13 is provided with a multiplicity of through-openings 25, which are parallel to the axis, are distributed equidistantly along the circumference of the elastomeric ring 13 and lead from the flank face or end face 18 to the flank face or end face 19.

The diameter of the cylindrical surface 16 is just as large as the outside diameter of the seating face 8 or slightly smaller, just sufficient for an interference fit of the tire 3 on the pulley body 3 to be achieved.

The ring 14, which is slightly further on the outside in the radial direction and adjoins the ring 13, is a reinforcing ring. It consists of a plastic molding, which has the contoured cross-sectional form which can be seen from FIG. 2. The cross-sectional form of the reinforcing ring 14 is constant along the entire circumference.

The reinforcing ring 14 is defined on its radially inner side by a cylindrical surface 26, two side or flank faces 27 and 28, and a radially outer circumferential surface 29. The radially inner circumferential surface 26 is the complementary cylindrical surface to the circumferential surface 17 of the inner ring 13. The flank faces 27 and 28 are provided with a recess in the region of the two lateral strips 21 and 22, whereas above the lips 23 and 24, the distance between the flank faces 27 and 28 is equal to the width of the cylindrical surface 16.

Above the two lips 23 and 24, the flank faces 27 and 28 are annular surfaces parallel to one another, adjoining which, further on the outside in the radial direction, is a further recess having an axial depth corresponding to the recess in the region of the strips 21 and 22.

The outer circumferential surface 29 is a surface of rotation concentric to the axis of rotation and is designed in a groove or channel shape, as can be seen from FIG. 2. This results in a groove which runs in the circumferential direction and has a curvature radius corresponding to the distance of this outer circumferential surface 29 from the core of a rope running over the pulley 1.

The reinforcing ring 14 is cohesively connected to the inner elastomeric ring 13 in the region of the circumferential surfaces 17 and 26, in the region of the two strips 21 and 22, and in the region of the lips 23, 24.

The raised lateral strips 21 and 22 are intended to prevent the cohesive connection between the surfaces 17 and 26 from tearing from the flank on account of the flexing movements which occur.

The ring 15, which is furthest on the outside in the radial direction, is likewise an elastomeric ring, which, however, has a greater hardness than the inner elastomeric ring 13. The material of the outer elastomeric ring 15 has a Shore hardness of between 70 and 95.

The outer elastomeric ring 15 is defined radially on the inside by an inner circumferential surface 31, radially on the outside by an outer circumferential surface 32 and laterally by two flank faces 33 and 34. The inner circumferential surface 31 has the same course and the same form as the outer circumferential surface 29 of the reinforcing ring 14.

The two lateral flank faces 33 and 34 merge into two strips 35 and 36, which point radially inward and are formed in the radially outer recess in the flank faces 27 and 28 of the reinforcing ring 14. The two strips 35 and 36 are laterally drawn in slightly, so that a slot 37 which runs in the circumferential direction is produced in the region of these two strips 35 and 36 on each front face of the tire 3. The slots 37 are open toward the flank of the tire 3.

The outer circumferential surface 32 is provided with a rope groove 38, the radius of curvature of which is approximately equal to the distance between the core of a rope running over it and the outer circumferential surface 32. The rope groove 38 is located centrally between the flank faces 33 and 34.

A small V-shaped slot 39 or 41, respectively, is in each case provided next to both sides of the rope groove 38.

As in the case of the inner elastomeric ring 13, the outer elastomeric ring 15 is also cohesively connected to the reinforcing ring 14. The cohesive connection between the surfaces 31 and 29 is in this case to be protected from tearing by the lateral strips 35 and 36.

The cross-sectional form of the tire 3 and its individual rings 13, 14, 15 forming it is constant along the circumference. The individual interruptions in this course are blind openings 42, which extend from the flanks 27 and 28 into the reinforcing ring 14. These blind openings 42 are intended to reduce the weight of the reinforcing ring 14 and thus help to save material on the one hand and promote the heat dissipation from the interior of the tire 3 on the other hand.

In order to achieve this function, the two flange disks 12, which secure the tire 3 in place on the seating face 8 in the axial direction, contain corresponding openings 43, which as far as possible are in alignment with the blind openings 42 in the assembled state.

In addition, there may also be further through-openings (not shown) in the flange disks 12, these further through-openings being located at a level corresponding to the through-openings 45.

To assemble the tire shown in FIG. 2, first of all one of the two flange disks 12 is screwed to the pulley body 2 by means of the fastening screws 11. The tire 3 is then pulled onto the seating face 8 in the axial direction until it bears with the flank faces 27 or 28 against the inside of the fastened flange disk 12. The second flange disk 12 is then mounted and fastened with the screws 11.

If a suspension rope of an aerial tramway for the conveyance of passengers or materials runs over the pulley 1 designed in this way, the rope is directly in contact with the outer elastomeric ring 15. Since this ring 15 is made of a comparatively hard elastomer, good abrasive resistance is achieved, whereas, on the other hand, the generation of noise is slight.

Due to the weight of the rope running over it, with the gondolas hanging thereon, the outer elastomeric ring 15 will be deformed to a comparatively small extent on account of its considerable hardness.

On the other hand, the inner elastomeric ring 13 is substantially softer, for which reason it will be deformed, although not only locally, but over its entire circumferential region. The reinforcing ring 14 contained between the two elastomeric rings 13 and 15 distributes the force originating from the weight of the rope in such a way that the reinforcing ring 14 becomes slightly eccentric relative to the seating face 8. Directly below the rope supporting point, the inner elastomeric ring 13 is compressed, whereas it is stressed in tension at the location diametrically opposite this point relative to the axis of rotation. On the other hand, at two locations which are rotated exactly through 90° therefrom, only a shearing stress occurs in the elastomeric ring 13. Depending on which direction a shearing stress progresses starting from this location, the shearing stress decreases and turns into a compressive stress or changes to a tensile stress. In this way, the flexing stress of the tire 3 which occurs when the rope runs over it is uniformly distributed over the entire circumference of the inner ring 13. Consequently, the inner ring 13 may be made of a comparatively very soft elastomeric material, since the rope pressure is directed into the rigid pulley body 2 over a relatively large area.

The soft elastomeric material may be provided with very little internal damping, whereby the work occurring due to the flexing is kept small and the inner elastomeric ring 13 heats up only slightly as a result of the flexing.

When the clamping socket, via which the stem of the gondola is connected to the rope, runs over the pulley 1 described, a force directed downward is briefly produced on account of the apparent rope thickening. The relatively soft inner elastomeric ring 13 can readily yield to the thickening.

Since elastomers are known to be incompressible, a corresponding cross-sectional change is produced by the deformation as a result of the rope force. So that this cross-sectional change can actually occur and is not blocked by the two flange disks 12, the two flanks 18 and 19 of the inner elastomeric ring 13 run toward one another. This results in a wedge-shaped gap in each case relative to the two flange disks 12, the wedge-shaped gap being filled during the local compression of the elastomeric ring 13.

The lateral grooves 37 and the V-shaped slots 39 and 41 contained on the top side have a similar function.

In order to vary the compliance, damping and abrasion behavior, the inner and/or outer elastomeric ring 13, 15, if need be, may contain textile inlays of metallic filaments, plastic or natural fibers. In addition, a textile inlay in the inner ring 13 can improve the friction grip between the tire 3 and the pulley body 2.

Figure 3:
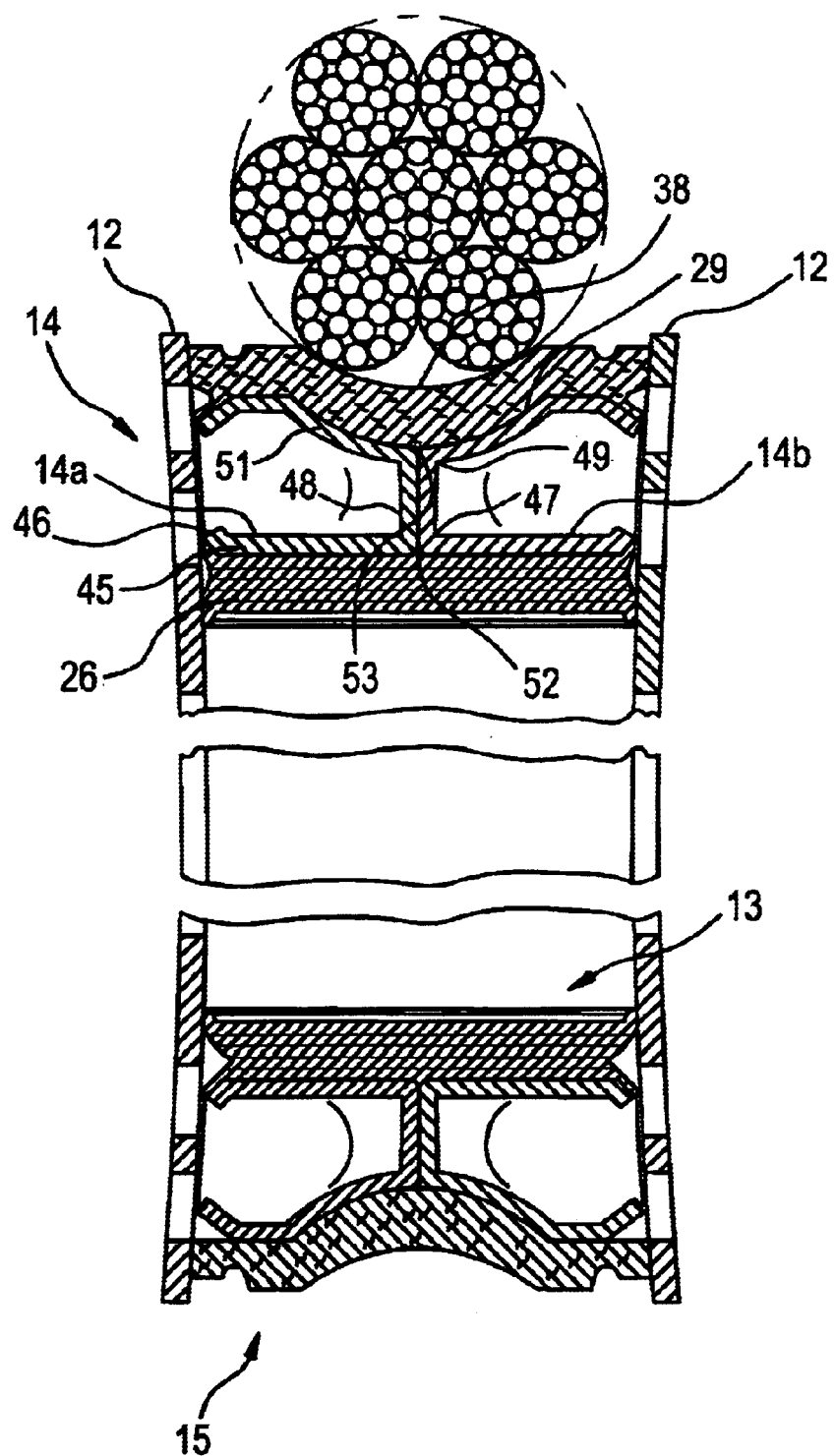
FIGS. 3 and 4 show other exemplary embodiments for the tire of the pulley according to the invention in a cross section.

In the exemplary embodiment according to FIG. 2, the reinforcing ring 14 is a plastic molding, if need be fiber-reinforced. If this strength is not sufficient in order to adequately distribute the loading over the circumference of the inner ring 13, a reinforcing ring 14, as shown in FIG. 3, may also be used. This reinforcing ring 14 consists of two ring halves 14a and 14b, which have the same form and are arranged the opposite way round from one another. The reinforcing ring 14 obtained in this way has essentially the same outer contour as the reinforcing ring 14 according to FIG. 2, i.e. it forms a radial inner circumferential surface 26 which is continuous throughout and a radially outer circumferential surface 29 which follows the course of the rope groove 38. The difference in the outer contour consists essentially in the recesses, which in a sheet-metal formed part can be designed with flanks which are not so steep.

The ring half 14a, in the same way as the ring half 14b, is a sheet-metal formed part of U-shaped cross section having an essentially straight leg 45, which is bent inward at its outer end at 46. The sheet-metal formed part merges at 47 into a flat back 48, which in the assembled state runs parallel to a plane perpendicular to the axis of rotation. This is followed in turn at 49 by a leg 51 which runs outward and is designed in such a way that the desired outer form is obtained.

In order to obtain the complete ring 14, the two ring halves 14a and 14b are arranged so as to bear against one another with their two backs 48 and, for example along the two fillets resulting from this, are welded to one another at 52 and 53.

Since the construction is otherwise the same as in the exemplary embodiment according to FIG. 2, the remaining components do not need to be explained further.

Figure 4:
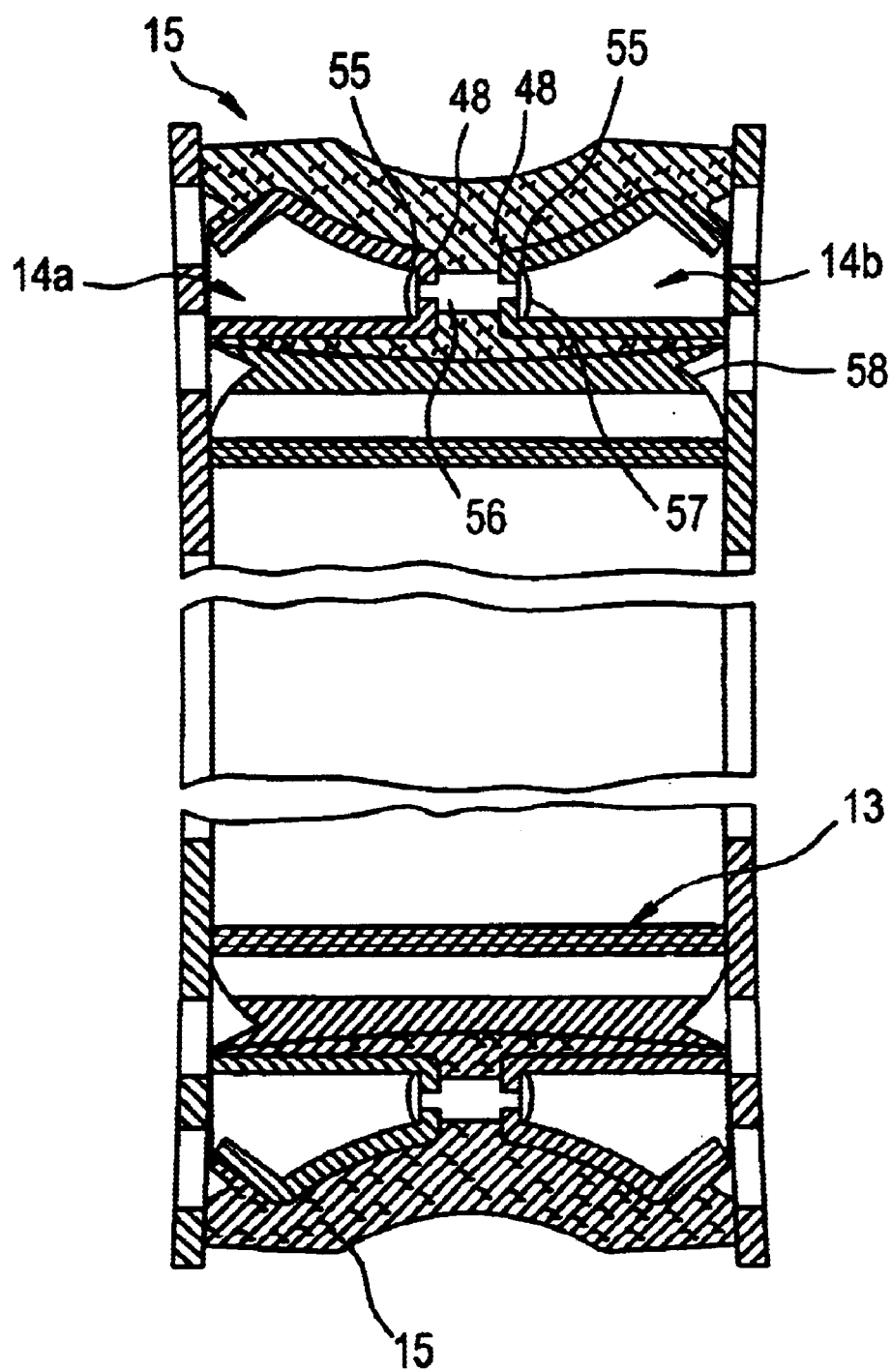

Shown in FIG. 4 is an exemplary embodiment in which the reinforcing ring 14 again consists of two halves 14a and 14b produced as a sheet-metal formed part. These two halves 14a and 14b have a U-shaped form as viewed in cross section and are identical to one another. The essential difference from the embodiment according to FIG. 3 consists in the fact that the axial depth of the sheet-metal formed parts is slightly smaller, so that, as can be seen in FIG. 4, the two backs 48 are at a distance from one another.

In order to fasten them to one another, the backs 48 contain holes 55 which are uniformly spaced apart along the circumference and through which cylindrical rivets 56 pass, which are riveted inside the respective profile while forming a closing head 57. As a result, it becomes possible, during the production of the outer elastomeric ring 15, to allow its material to pass radially inward through the gap between the two halves of the reinforcing ring 14. The reinforcing ring 14 therefore no longer forms a boundary between the elastomeric outer ring 15 and the elastomeric inner ring 13. On the contrary, in the exemplary embodiment according to FIG. 4, it is embedded in the outer elastomeric ring 15. The two elastomeric rings 13 and 15 meet one another directly at a boundary layer 58. This boundary layer has the form of a double cone with the orientation as follows from FIG. 4, i.e. the thickness of the inner elastomeric ring 15 is smallest at the center between the two flange disks 12.

At the boundary layer 58, the two rings 13 and 15 may either be cohesively connected to one another or are produced separately from one another in order to be fitted into one another subsequently.

Otherwise, the design of the tire 3 according to FIG. 4 corresponds to the design of the tire 3 according to FIG. 2.

It goes without saying that the reinforcing ring 14 may also be embodied as a metal casting or forging or may be assembled from such parts.

Figure 5:
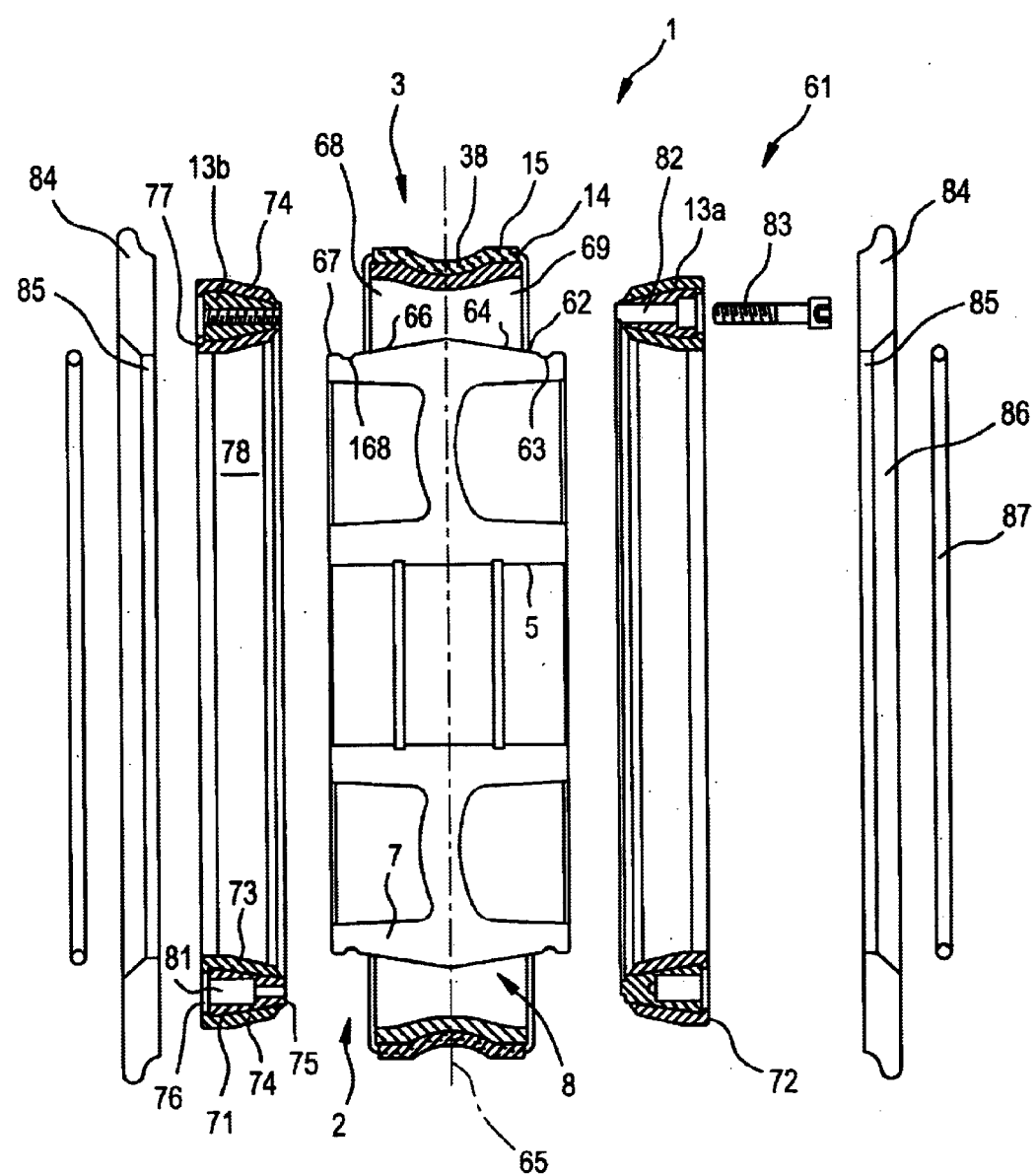
FIG. 5 shows a pulley according to the invention with radially acting clamping device, in an exploded representation and in longitudinal section.

FIG. 5 shows another exemplary embodiment of the pulley 1 according to the invention. The essential difference from the previous exemplary embodiments consists in the use of an additional clamping device 61.

Whereas in the previous exemplary embodiments the pulley body 2 has the form of a spoked wheel, it is designed as a disk wheel in the exemplary embodiment according to FIG. 5.

The seating face 8 for the tire 3 starts at one of the front faces of the seating face 8 with a short cylindrical section 62, which contains a snap-ring groove 63. Adjoining the cylindrical section 62 is a frustoconical surface 64, which is oriented in such a way that the diameter increases continuously from the cylindrical section 62 in the direction of the opposite front face of the pulley body 2. The largest diameter, relative to the axial extent of the pulley body 2, is reached approximately at the center of the latter at a plane of symmetry 65. A second frustoconical surface 66 starts at this location, but with the opposite orientation, i.e. the diameter tapers starting from the plane of symmetry 65. Finally, the frustoconical surface 66 merges into a further cylindrical surface 67, which likewise contains a snap-ring groove 168. The diameter of the two cylindrical surfaces 62 and 67 is identical. The outer circumferential surface or the seating face 8, relative to the axis of rotation, is rotationally symmetrical, but no longer cylindrical as in the previous exemplary embodiments.

As before, the radially outer ring 15 and the reinforcing ring 14 belong to the tire 3.

The radially outer ring 15 is relatively thin-walled and contains the rope groove 38 in its outer side. The radially outer ring 15 is made of a rigid plastic or an elastomer having a Shore hardness of between 80 and 100.

In contrast to the previous exemplary embodiment, the reinforcing ring 14, which is cohesively connected to the radially outer ring 15, for example by vulcanizing, is comparatively thin-walled, relative to the radial direction. It is made of a similar material as explained in connection with the previous exemplary embodiments. Its bore, unlike the previous exemplary embodiment, is not a cylindrical bore, but has the form of a double conical frustum, consisting of two frustoconical surfaces 69 and 68, which are oriented in such a way that, relative to the axial extent, a constriction is obtained in the center of the reinforcing ring 14. The angular areas of the conical surfaces 68 and 69 are complementary to the conical surfaces 64 and 66 as formed on the pulley body 2.

The diameter of the two frustoconical surfaces 68 and 69, as FIG. 5 shows, is markedly larger than the diameter of the two frustoconical surfaces 64 and 66. In this way, an annular gap, which is defined by a total of four conical surfaces, is obtained between the reinforcing ring 14 and the seating face 8.

The radially inner ring, which was unsplit in the previous exemplary embodiments, is composed of two sections 13a and 13b in the exemplary embodiment according to FIG. 5. The two sections 13a and 13b are in mirror symmetry relative to one another and are in each case the generated surface of conical frustums. Their axial extent is approximately equal to the length of the conical generated surface 68 or 69 respectively.

The clamping device 61 comprises two clamping rings 71 and 72, which are essentially in mirror symmetry relative to one another. The clamping ring 71 is defined in the radial direction by two frustoconical surfaces 73 and 74, which are oriented in such a way that they converge in the direction of the plane of symmetry 65. Extending between the two frustoconical surfaces 73 and 74 are two end faces 75 and 76. These end faces 75 and 76 are flat faces in the broadest sense, the end face 75 facing the plane of symmetry 65. The material of the clamping ring 71 is, for example, steel.

The part 13b of the radially inner ring is vulcanized in place on the frustoconical surface 74. The cone angle of the frustoconical surface 74 is selected in such a way that the frustoconical surface 74 runs parallel to the frustoconical surface 68. The same correspondingly applies to the frustoconical surface 73 relative to the frustoconical surface 66.

In order to achieve as good an elastic action as possible, a further elastomeric ring 77 is vulcanized in place on the radially inner frustoconical surface 73, the elastomeric ring 77 being made of the same material as the radially inner ring 13b. Its free surface 78 is in turn a frustoconical surface, which runs parallel to the frustoconical surface 66.

Parallel to the axis of the pulley body 3, the clamping ring 71 alternately has tapped holes 79 and stepped holes 81.

The clamping ring 72 has essentially the same form as the clamping ring 71, for which reason the structural elements there are provided with the same reference numerals as the structural elements of the clamping ring 71. The clamping ring 72 also bears an additional elastomeric coating 77 on its inside, which circumscribes a frustoconical bore 78. However, instead of the tapped holes 79, the clamping ring 72 contains stepped holes 82, which serve to receive fastening screws 83.

Finally, two identical flange disks 84, which are designed as flat disks, complete the construction of the pulley 1, the bore 85 of the flange disks 84 having a diameter corresponding to the outside diameter of the two cylindrical sections 62 and 67. The bore 85 is defined toward the outside by a bevel surface 86, in which a snap ring 87 finds space in the assembled state when it is inserted into the snap-ring groove 63 or 68.

The pulley 1 according to the invention is assembled as follows:

First of all the clamping ring 71 with the radially outer ring 13b vulcanized in place and the elastomeric coating 77 is put onto the pulley body 3 from the left-hand side. The left-hand flange disk 84 is then put on and the left-hand snap ring 87 is snapped into the snap-ring groove 168. The unit consisting of the reinforcing ring 14 and the radially outer ring 15 can now be slipped on from the right without the clamping ring 71 being able to give way to the side. The right-hand clamping ring 72 is then likewise put onto the pulley body 3 from the right. Once the arrangement has been prepared to this extent, the clamping rings 71 and 72 are rotated relative to one another until each tapped hole 79 is opposite a stepped hole 82. Screws 83 are then screwed into each combination of tapped hole 79 and stepped hole 82 and tightened one after the other. As a result of the frustoconical form of the two clamping rings 71 and 72 in combination with the frustoconical surfaces 64, 66, 68, 69, a radial clamping force is produced when the two clamping rings 71 and 72 are being screwed together, and this radial clamping force is directed, on the one hand, radially inward against the two frustoconical surfaces 64 and 66 and, on the other hand, radially outward against the two frustoconical surfaces 68 and 69. The clamping rings 71 and 72 act like annular wedges, which are pressed between the conical surfaces 66, 68 and 62, 69 respectively.

Finally, the right-hand flange disk 84 is put on and secured by means of the right-hand snap ring 87 snapped into the snap-ring groove 63. The pulley 1 is thus completely assembled.

The pretension, with which the two sections 13a and 13b of the radially inner ring, or the elastomeric coatings 77 on the inside of the two clamping rings 71 and 72 are pretensioned, can be regulated by more or less pronounced tightening of the screws 83. The materials for the sections 13a and 13b of the radially inner ring are expediently the same as for the elastomeric coatings 77 and they also have the same wall thickness. In this way, the elastomeric coatings 77 also have an elastic action when a clamping socket runs over the pulley and attempts to push away the outer circumferential surface of the tire radially relative to the hub 5.

The pretension, caused by the clamping rings 71 and 72, in the radially inner ring 13a or 13b and in the elastomeric coating 77 acts in such a way that the radially inner ring 13a or 13b and the elastomeric coating 77 are not deformed further until after a certain radial force, determined by the pretension, is exceeded. However, the further deformation takes place with the same hardness or softness, as if there were no additional pretension. In this way, the flexing work can be reduced when, for example, only the empty rope runs over the pulley 1. Deformation of the radially inner ring 13a or 13b or of the elastomeric coatings 77 and consequently also flexing work result only when greater forces occur.

As a result of the radial pretension, the reinforcing ring 14, together with the radially outer ring firmly vulcanized on it, is reliably held in place on the seat 8 in a frictional manner. If the friction grip is not sufficient, it is also possible to cohesively connect the coating 77 to the frustoconical surface 64 or 66 during assembly, for example if an adhesive is introduced during assembly or if the boundary surface is subsequently vulcanized after assembly. The same can be done between the frustoconical surface 68 or 69 and the outside of the radially inner ring 13a or 13b.

Conversely, as follows from the explanation of the assembly, dismantling is readily possible in a simple manner by the above mentioned manipulations being carried out in the reverse sequence. In this way, the tire 3, which is subject to wear, and/or the clamping rings 71, 72 can be exchanged even when a pulley is mounted on a mast.

A pulley consists of a pulley basic body which has a cylindrical outer circumferential surface. Sitting on this cylindrical outer circumferential surface is a tire, which is of sandwich-like design with regard to its radial extent. This results in a plurality of rings concentric to one another. The ring which is furthest on the inside in the radial direction and the ring which is furthest on the outside in the radial direction is in each case an elastomeric ring, whereas a reinforcing ring is located between them. The elastomeric outer ring is harder than the elastomeric inner ring, so that a very abrasion-resistant surface is achieved, over which the rope runs, whereas the elastomeric inner ring provides for adequate resilience. The reinforcing ring is provided in order to distribute the rope load as uniformly as possible over the elastomeric inner ring.

What is claimed is:

1. A pulley comprising:

a pulley body which has a rotationally symmetrical outer circumferential surface and a pulley hub, and having a tire which sits on the outer circumferential surface and has at least one radially outer and one radially inner ring and also a reinforcing ring, the reinforcing ring being made of a material which is rigid relative to the radially inner and the radially outer rings, the reinforcing ring having a diameter which is smaller than the outside diameter of the radially outer ring, the radially inner ring being made of an elastomer, the radially outer ring being made of an elastomer or a plastic, and the radially outer ring having a greater Shore hardness than the radially inner ring, wherein the reinforcing ring consists of two parts which are joined together along a radial plane and are fastened to one another.

2. The pulley as claimed in claim 1, wherein the two parts of the reinforcing ring bear directly against one another.

3. The pulley as claimed in claim 1, wherein the two parts of the reinforcing ring are connected to one another while forming at least one axial intermediate space.

4. A pulley comprising: a pulley body which has a rotationally symmetrical outer circumferential surface and a pulley hub, and having a tire which sits on the outer circumferential surface and has at least one radially outer and one radially inner ring and also a reinforcing ring, the reinforcing ring being made of a material which is rigid relative to the radially inner and the radially outer rings, the reinforcing ring having a diameter which is smaller than the outside diameter of the radially outer ring, the radially inner ring being made of an elastomer, the radially outer ring being made of an elastomer or a plastic, and the radially outer ring having a greater Shore hardness than the radially inner ring, wherein the outer circumferential surface of the pulley body forms a double cone, which has the largest diameter at the intersection between the two cones.

5. A pulley comprising:
a pulley body which has an outer circumferential surface; and
a tire which is disposed on the outer circumferential surface and which comprises:
an outer ring;
a separate inner ring; and
a reinforcing ring interposed between the outer ring and the inner ring, the reinforcing ring being made of a material which is rigid relative to the radially inner and the radially outer rings and which has at least one portion which is at least as thick as the radially outer ring, the radially inner ring being made of a first material, the radially outer ring being made of a second material having a greater Shore hardness than the material of the radially inner ring.

6. A pulley as claimed in claim 5, wherein the reinforcing ring has a non-uniform cross-section and is thicker at the sides than in the middle.

7. A pulley as claimed in claim 5, wherein the reinforcing ring has an indented cross-sectional profile.

8. A pulley suitable for use in an aerial tramway, comprising:
a pulley body which has a rotationally symmetrical outer circumferential surface,
a pulley hub,
a radially outer ring made of an elastomeric material and forming a groove for receiving a cable,
a stiffening ring provided radially within the diameter of the groove,
a radially inner ring made of an elastomeric material that is softer than the elastomeric material of the outer ring, and
a clamping device provided to secure the radially outer ring, the stiffening ring and the radially inner ring on the pulley hub.

9. The pulley as claimed in claim 8, wherein a the clamping device includes a mechanism for radially pretensioning the radially outer ring on the outer circumferential surface of the pulley body.

10. The pulley as claimed in claim 9, wherein the clamping device, relative to the axial direction of the pulley body, is split into two annular parts.

11. The pulley as claimed in claim 10, wherein the radially inner ring, relative to the axial direction of the pulley body, is split into two parts, and in that in each case one part of the radially inner ring sits on the corresponding part of the clamping device.

12. The pulley as claimed in claim 10, wherein each annular part of the clamping device has a frustoconical outer form and a frustoconical bore, the radial thickness at one axial end of each annular part being smaller than at the other axial end, and in that a ring is obtained in an assembled state, which ring, relative to its axial extent, is constricted approximately in the center.

13. The pulley as claimed in claim 10, wherein the two annular parts are screwed together by means of screws.

14. The pulley as claimed in claim 8, wherein the clamping device has an annular, essentially rotationally symmetrical form with a radially inner and a radially outer surface.

15. The pulley as claimed in claim 8, wherein the clamping device, relative to the radial direction, is fitted in between the radially inner ring and the outer circumferential surface of the pulley body.

16. The pulley as claimed in claim 8, wherein the clamping device, relative to the radial direction, is fitted in between the radially inner ring and the stiffening ring.

17. The pulley as claimed in claim 9, wherein the clamping device bears an elastomeric coating on its radially inner surface, said elastomeric coating being cohesively connected to the clamping device.

18. The pulley as claimed in claim 17, wherein the elastomeric coating is made of the same material as the radially inner ring.

19. The pulley as claimed in claim 8, wherein the radially outer ring is arranged on the outer circumference of the stiffening ring.

20. The pulley as claimed in claim 8, wherein the radially inner ring is non-detachably connected to the clamping device.

21. The pulley as claimed in claim 8, wherein the clamping device is axially divided into two parts that clamp in the axial direction.

22. The pulley as claimed in claim 21, wherein the radially inner ring is axially divided into two parts and each part is secured to one of the two parts of the clamping device.

23. The pulley as claimed in claim 21, further comprising fasteners connecting the two parts of the clamping device to one another.

24. The pulley as claimed in claim 23, wherein the fasteners are threaded fasteners.

25. The pulley as claimed in claim 8, wherein the radially inner ring is axially divided into two parts.

26. The pulley as claimed in claim 8, wherein the reinforcing ring is embedded in one of the radially outer and the radially inner ring.

27. The pulley as claimed in claim 8, wherein the stiffening ring is a sheet-metal formed part.

28. The pulley as claimed in claim 8, wherein the stiffening ring is a forging.

29. The pulley as claimed in claim 8, wherein the stiffening ring is a casting.

30. The pulley as claimed in claim 8, wherein at least one of the radially outer or the radially inner ring is connected to the stiffening ring in a positive-locking manner.

31. The pulley as claimed in claim 8, wherein the stiffening ring is fiber-reinforced.

* * * * *